(12) United States Patent
Yamanoue

(10) Patent No.: US 8,477,659 B2
(45) Date of Patent: Jul. 2, 2013

(54) AUDIO/VIDEO COMMUNICATION SYSTEM

(75) Inventor: Takashi Yamanoue, Kagoshima (JP)

(73) Assignees: Kagoshima University, Kagoshima (JP); Nara Information System Co., Ltd., Nara (JP)

( * ) Notice: Subject to any disclaimer, the term of this patent is extended or adjusted under 35 U.S.C. 154(b) by 1186 days.

(21) Appl. No.: 12/364,687

(22) Filed: Feb. 3, 2009

(65) Prior Publication Data

US 2009/0133082 A1 May 21, 2009

Related U.S. Application Data

(63) Continuation of application No. PCT/JP2007/065051, filed on Aug. 1, 2007.

(30) Foreign Application Priority Data

Aug. 4, 2006 (JP) .................................. 2006-213625

(51) Int. Cl.
*H04L 12/28* (2006.01)

(52) U.S. Cl.
USPC .......................... 370/256; 709/218; 709/224

(58) Field of Classification Search
USPC .................. 370/236, 256; 709/218, 204, 224
See application file for complete search history.

(56) References Cited

U.S. PATENT DOCUMENTS

2009/0307348 A1* 12/2009 O'Neal et al. ................. 709/224
2010/0110935 A1*  5/2010 Tamassia et al. ............. 370/256

FOREIGN PATENT DOCUMENTS

JP          08-084157 A     3/1996

OTHER PUBLICATIONS

Official communication issued in counterpart International Application No. PCT/JP2007/065051, mailed on Feb. 10, 2009.
Official Communication issued in International Patent Application No. PCT/JP2007/065051, mailed on Oct. 23, 2007.
Yamanoue, "A System Which Shares the Common Operation on a Distributed System in Realtime Using P2P Technology," Journal of Information Processing Society of Japan, Feb. 15, 2005, vol. 46, No. 2, pp. 392-402.
Kunichika et al., "Application Level Multicast with Backup Parent Searching Function," Technical Report of the Institute of Electronics, Information and Communication Engineers, Feb. 26, 2004, vol. 103, No. 691, pp. 7-12.
Hirahara et al., "The Electronic Chalkboard System for Distributing Network Enviroment Using TCP," Journal of Information Processing Society of Japan, Jan. 2002, vol. 43, No. 1, pp. 176-184.
Jagadish et al., "Baton: A Balanced Tree Structure for Peer-to-Peer Network," Proceedings of the 31st VLDB Conference, 2005, 12pgs.

* cited by examiner

Primary Examiner — Mark Rinehart
Assistant Examiner — Matthew Hopkins
(74) Attorney, Agent, or Firm — Keating & Bennett, LLP

(57) ABSTRACT

An audio/video communication system includes plural network terminals. Each network terminal has a communication node and a stand-by node. Every node in a communication group has a first lower node connector and a second lower node connector, and is arranged to store a first value indicating a number of nodes in a first side diverging from the first lower node connector and a second value indicating a number of nodes in a second side diverging from the second lower node connector. A new node is added to the communication group such that the first value and the second value stored in each node is substantially equal, in order to define a balanced binary tree structure. Data sent from a node in the communication group reaches all other nodes in the communication group within a time proportional to a logarithm of the number of nodes in the communication group.

8 Claims, 21 Drawing Sheets

FIG. 1A
PRIOR ART
FIG. 1B
SKYPE
INVENTIVE
COMMUNICATION
SYSTEM
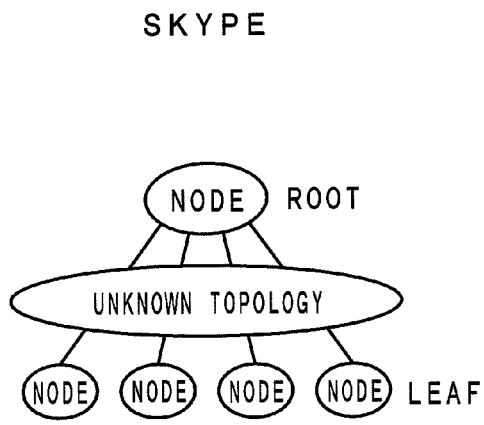
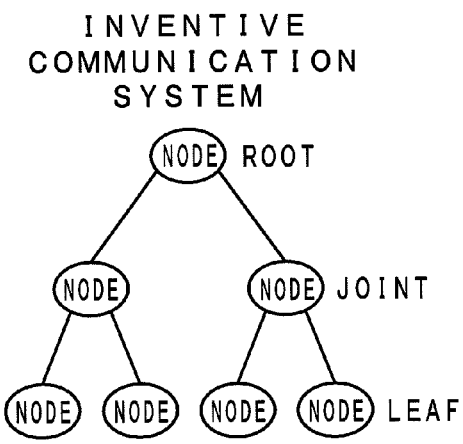
FIG. 2A
PRIOR ART
FIG. 2B
ELECTRONIC
CHALKBOARD
SYSTEM
INVENTIVE
COMMUNICATION
SYSTEM
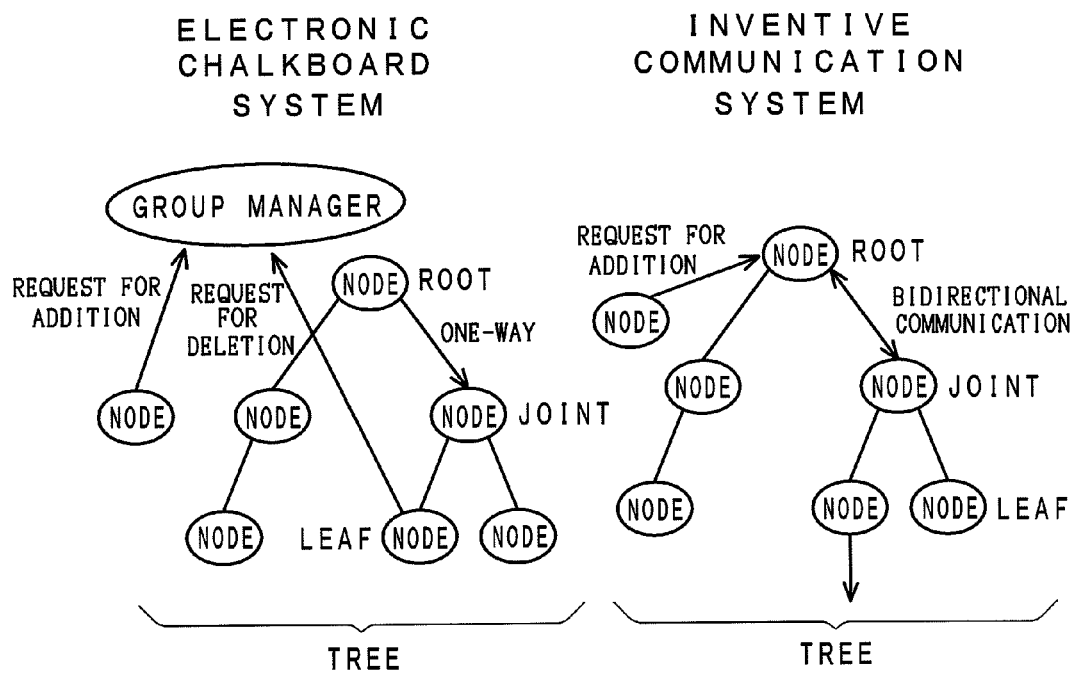

FIG. 3A
PRIOR ART

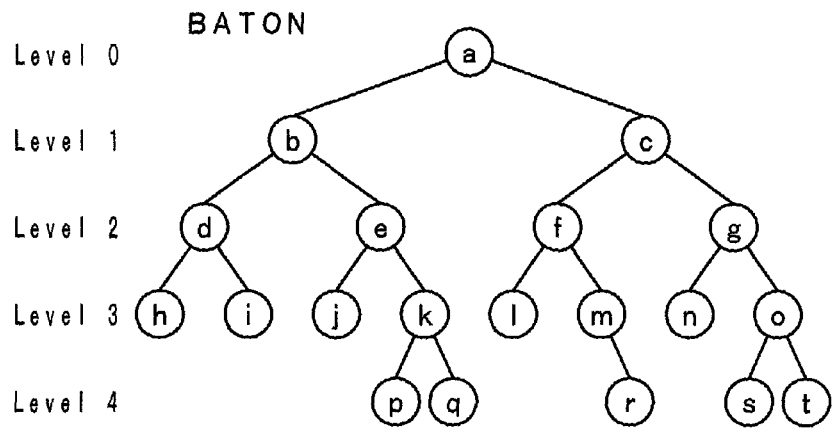

FIG. 3B
PRIOR ART

Node m: level=3, number=6
parent=f, left child=null, right child=r
left adjacent=f, right adjacent=r
Left routing table:

|   | Node | Left child | Right child | Lower bound | Upper bound |
|---|------|------------|-------------|-------------|-------------|
| 0 | l    | null       | null        | l lower     | l upper     |
| 1 | k    | p          | q           | k lower     | k upper     |
| 2 | i    | null       | null        | i lower     | i upper     |

Right routing table:

|   | Node | Left child | Right child | Lower bound | Upper bound |
|---|------|------------|-------------|-------------|-------------|
| 0 | n    | null       | null        | n lower     | n upper     |
| 1 | o    | s          | t           | o lower     | o upper     |

FIG. 3C
INVENTIVE
COMMUNICATION
SYSTEM

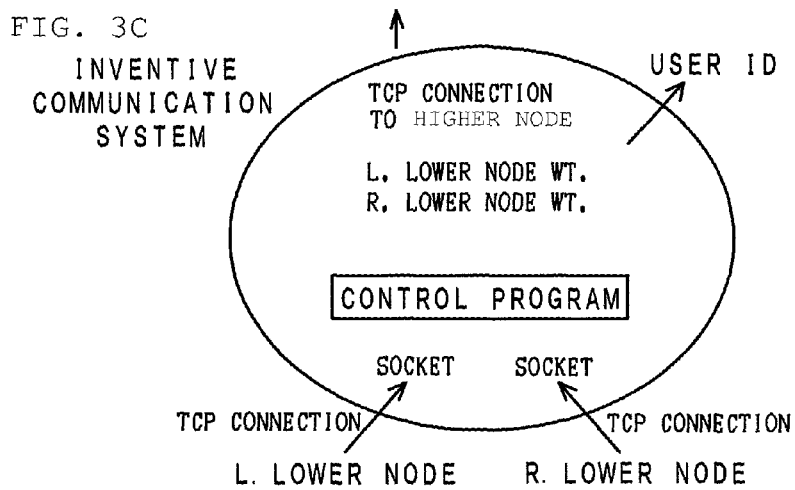

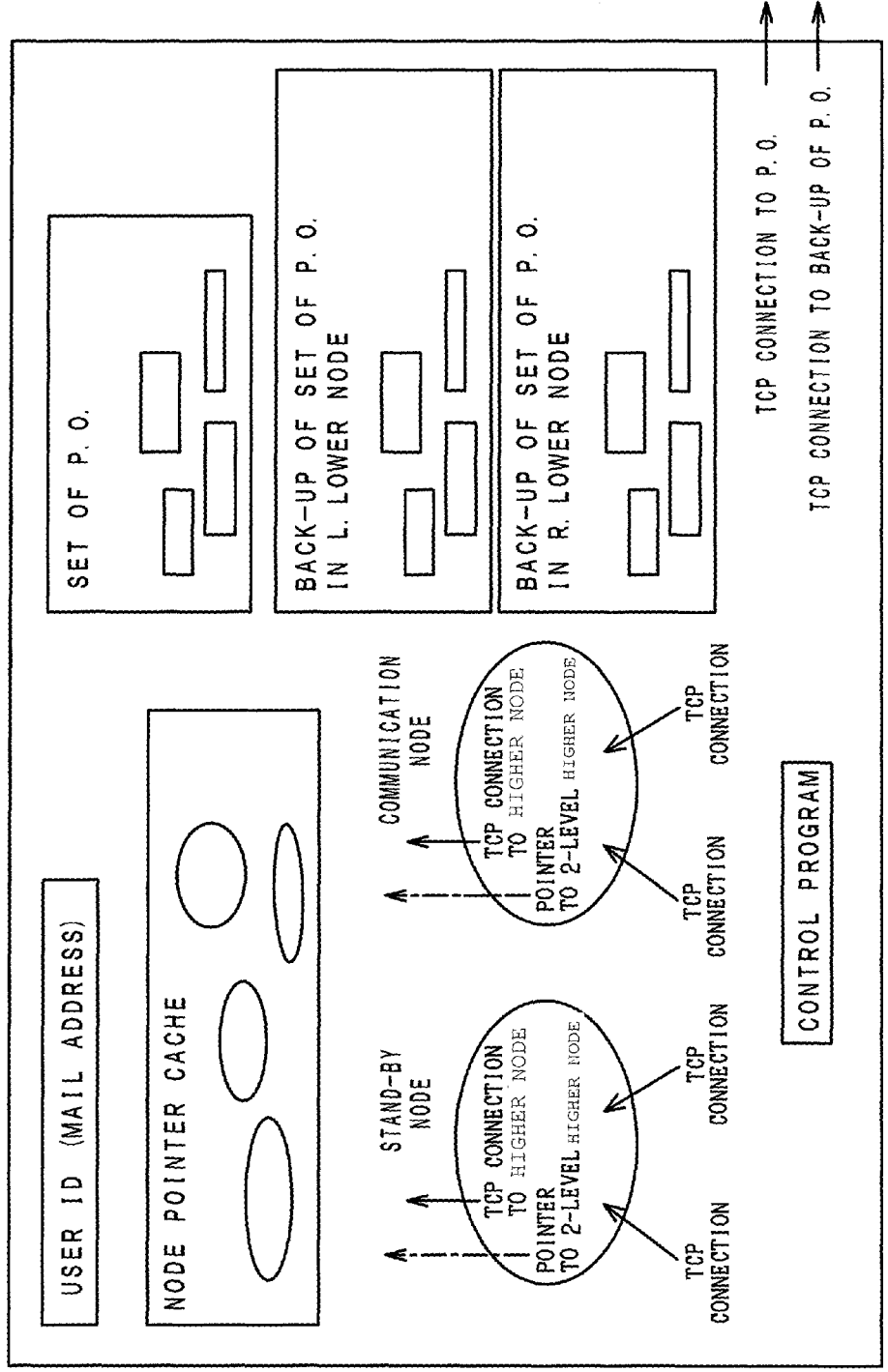

F I G . 2 1
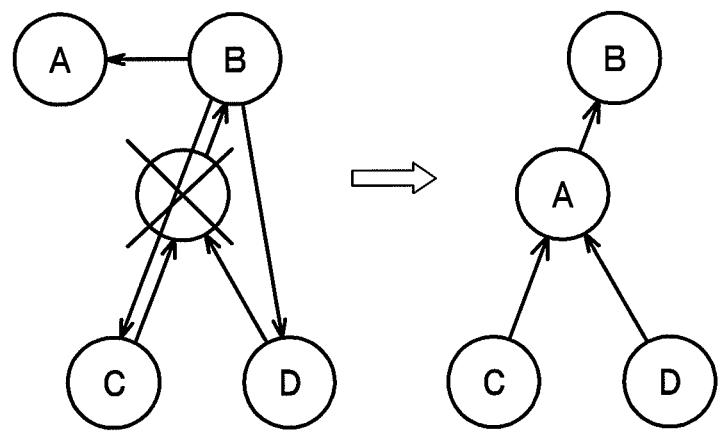

F I G. 2 2
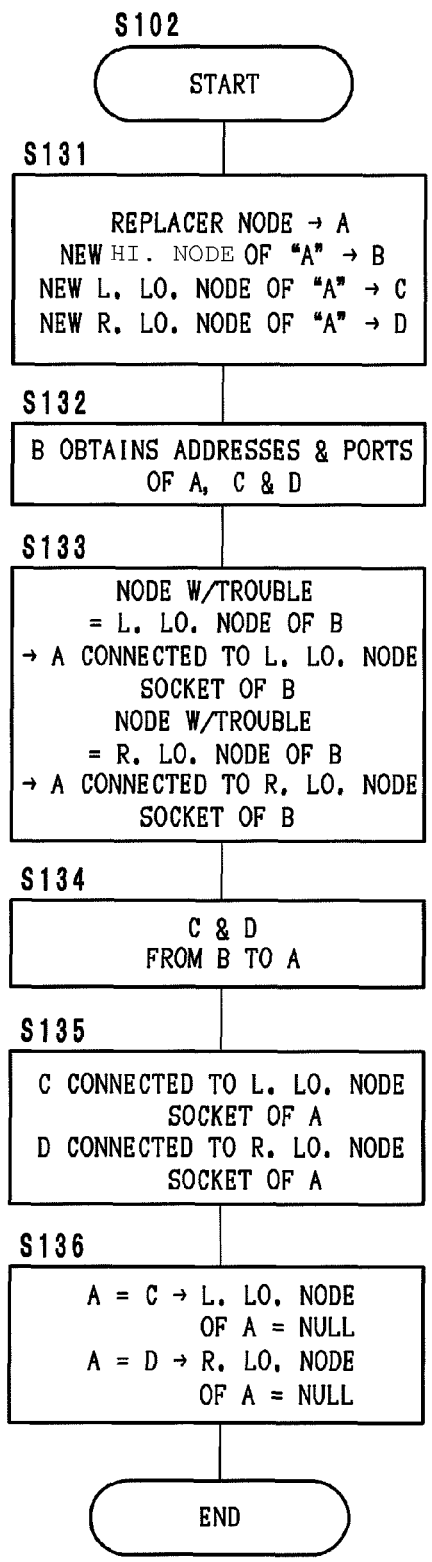

AUDIO/VIDEO COMMUNICATION SYSTEM

BACKGROUND OF THE INVENTION

1. Field of the Invention

The present invention relates to an audio/video communication system, and more particularly to an audio/video communication system that is an improved P2P system for use on the Internet.

2. Description of the Related Art

Recently, the Internet has been diffused conspicuously, and users in the world can communicate with one another by using inexpensive devices. P2P especially attracts attention because it has the following advantages: P2P permits the users to communicate with one another not via an expensive server but via a large number of nodes; and even if a device has trouble, an effect of the trouble is small.

As systems using P2P, conventionally, SKYPE, an electronic chalkboard system (see The Electronic Chalkboard System for Distributing Network Environment Using TCP, Journal of Information Processing Society of Japan, Vol. 43, No. 1, pp. 176-184) and BATON (see BATON, a Balanced Tree Structure for Peer-to Peer Networks, Proceedings of the 31st VLDB Conference, pp. 661-672) are known.

SKYPE is an IP telephone system that uses P2P. In SKYPE, a server is not used, calls are free of charge, and a firewall does not prevent a call. However, communication among more than five people is impossible, and communication via a large number of nodes is impossible with this system.

The electronic chalkboard system is an educational system that uses P2P. In the system, a large number of nodes are connected into a balanced binary tree structure, and a large volume of data can be sent to a large number of nodes. However, a group manager is required to manage the nodes, and as the number of nodes increases, it becomes difficult to manage all the nodes with the group manager. Also, only one device can send data to other plural devices, and one group can share only one kind of data in the system.

BATON is a P2P search system of a balanced binary tree structure. An addition of a node to a group, a deletion of a node from a group or a search for a node in a group can be executed for a time of O(log N), and no load is applied to the root node. However, it is necessary to maintain and manage tables in the nodes, and an addition of a node or a deletion of a node may be followed by necessity for plural nodes to shift their positions in the tree structure. If too many such cases occur in a short time, it may be difficult to maintain the tree structure.

SUMMARY OF THE INVENTION

Accordingly, preferred embodiments of the present invention provide an audio/video communication system, using P2P and the Internet, that permits inexpensive worldwide real-time communication beyond firewalls and concurrent audio/video data sending/receiving among a large number of nodes and that achieves flexible management for additions of nodes to the system and deletions of nodes from the system.

In an audio/video communication system according to a first preferred embodiment of the present invention, every node in a communication group has a first lower node connector and a second lower node connector and stores a first value indicating a number of lower nodes in a first side diverging from the first lower node connector and a second value indicating a number of lower nodes in a second side diverging from the second lower node connector, and a new node is added to the communication group such that the first value and the second value stored in each node in the communication group will be substantially equal to each other, so that connections among nodes in the communication group are automatically regulated to define a balanced binary tree structure. In the communication system, data sent from a node in the communication group reach all the other nodes in the communication group within a time in proportion to a logarithm of the number of nodes in the communication group.

Further, a second preferred embodiment of the present invention provides an audio/video communication system including a large number of nodes that are connected into a balanced binary tree structure, and in the communication system, each of the nodes includes at least a TCP (transmission control protocol) connector to an higher node, a first lower node connector, a second lower node connector and a control program and at least stores first weight information about a weight of lower nodes in a first side diverging from the first lower node connector and second weight information about a weight of lower nodes in a second side diverging from the second lower node connector. The communication system performs the following processing in constructing a group in a balanced binary tree structure: 1) if the first lower node connector of a root node is vacant, the root node connects a new node to the first lower node connector and increases the first weight information by "1"; 2) if the first lower node connector of the root node is occupied and if the second lower node connector of the root node is vacant, the root node connects a new node to the second lower node connector and increases the second weight information by "1"; 3) if both of the first lower node connector and the second lower node connector of the root node are occupied and if the first weight information of the root node is equal to or less than the second weight information of the root node, the root node sends a request for an addition of a new node to a first lower node that is directly connected to the first lower node connector and increases the first weight information by "1"; and 4) if both of the first lower node connector and the second lower node connector of the root node are occupied and if the first weight information of the node is greater than the second weight information of the node, the node sends a request for an addition of a new node to a second lower node that is directly connected to the second lower node connector and increases the second weight information by "1".

In the audio/video communication system according to various preferred embodiments of the present invention, a large number of nodes are connected into a balanced binary tree structure. Therefore, the communication system, using P2P, permits inexpensive worldwide real-time communication beyond firewalls and concurrent audio/video data sending/receiving among the large number of nodes without using any expensive servers, and data sent from a node in a communication group reach all the other nodes in the communication group within a time in proportion to a logarithm of the number of nodes in the communication group.

In the communication system, each node has a TCP connector to an higher node, a first lower node connector and a second lower node connector and stores first weight information about a weight of lower nodes in a first side diverging from the first lower node connector and second weight information about a weight of lower nodes in a second side diverging from the second lower node connector. Therefore, the communication system performs flexible management of both an addition of a new node to the system and a deletion of a node from the system, based on the first weight information and the second weight information of each node, and it takes only a very short time for an addition of a new node or a deletion of a node to be performed. Furthermore, a deletion of a node from the system and trouble in a node do not influence the entire system.

Now, the audio/video communication system according to various preferred embodiments of the present invention is briefly described, compared with conventional communication systems, namely, SKYPE, an electronic chalkboard system and BATON.

SKYPE is an IP telephone system using P2P. In SKYPE, as shown in FIG. 1A, at most five nodes can join a communication group. In the communication system according to a preferred embodiment of the present invention, as shown in FIG. 1B, plural nodes are connected into a balanced binary tree structure, and a large number of nodes can join a communication group. The nodes communicate with one another with a delay corresponding to only a logarithm of the number of nodes, and an addition of a new node and a search for a node can be completed within a very short time.

In an electronic chalkboard system, as shown in FIG. 2A, nodes are connected into a balanced binary structure. However, the electronic chalkboard system uses a group manager for the management of nodes, and therefore, management is complicated. In the communication system according to a preferred embodiment of the present invention, as shown in FIG. 2B, nodes are connected into a balanced binary structure as in the electronic chalkboard system. However, in the communication system, a group manager is not used, and all the nodes in the system operate autonomously, that is, are self-controlled. Therefore, even frequent additions and deletions of nodes do not result in concentration of loads on a specified node.

BATON, as shown in FIG. 3A, is a P2P system using a balanced binary tree structure. In BATON, as shown in FIG. 3B, each node has a routing table with a variable length, and maintenance of the routing tables is necessary. When the tree structure has lost its balance due to additions/deletions of nodes, plural nodes shall be moved, and concurrently the routing tables of the plural nodes shall be changed. In the communication system according to a preferred embodiment of the present invention, each node has a data structure as shown by FIG. 3C, which includes a TCP connector to an higher node, a left lower node connector (socket), a right lower node connector (socket) and a control program, and stores left weight information about a weight of left lower nodes and right weight information about a weight of right lower nodes. Thus, in the communication system, because each node does not have a variable-length data structure for maintaining the tree structure, the processing required for the addition of a node and the processing required for a deletion of a node are simple and speedy. In both BATON and in the communication system according to a preferred embodiment of the present invention, the processing rate is O(log N), but the processing in BATON is complicated. In the communication system according to various preferred embodiments of the present invention, only one node is moved for an addition or a deletion of a node.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 1A is an illustration showing a fundamental structure of SKYPE, and FIG. 1B is an illustration showing a fundamental structure of an audio/video communication system according to a preferred embodiment of the present invention.

FIG. 2A is an illustration showing a fundamental structure of an electronic chalkboard system, and FIG. 2B is an illustration showing the fundamental structure of the audio/video communication system according to a preferred embodiment of the present invention.

FIG. 3A is an illustration showing a fundamental structure of BATON, FIG. 3B is a chart showing a routing table stored in each node of BATON, and FIG. 3C is an illustration showing a data structure of each node in the audio/video communication system according to a preferred embodiment of the present invention.

FIG. 4 is an illustration showing the data structure of each node in the audio/video communication system according to a preferred embodiment of the present invention.

FIG. 21 is an illustration showing a change of the connection among nodes.

FIG. 22 is a flowchart showing a processing for changing the connection among nodes.

DETAILED DESCRIPTION OF THE PREFERRED EMBODIMENTS

Figure 5:
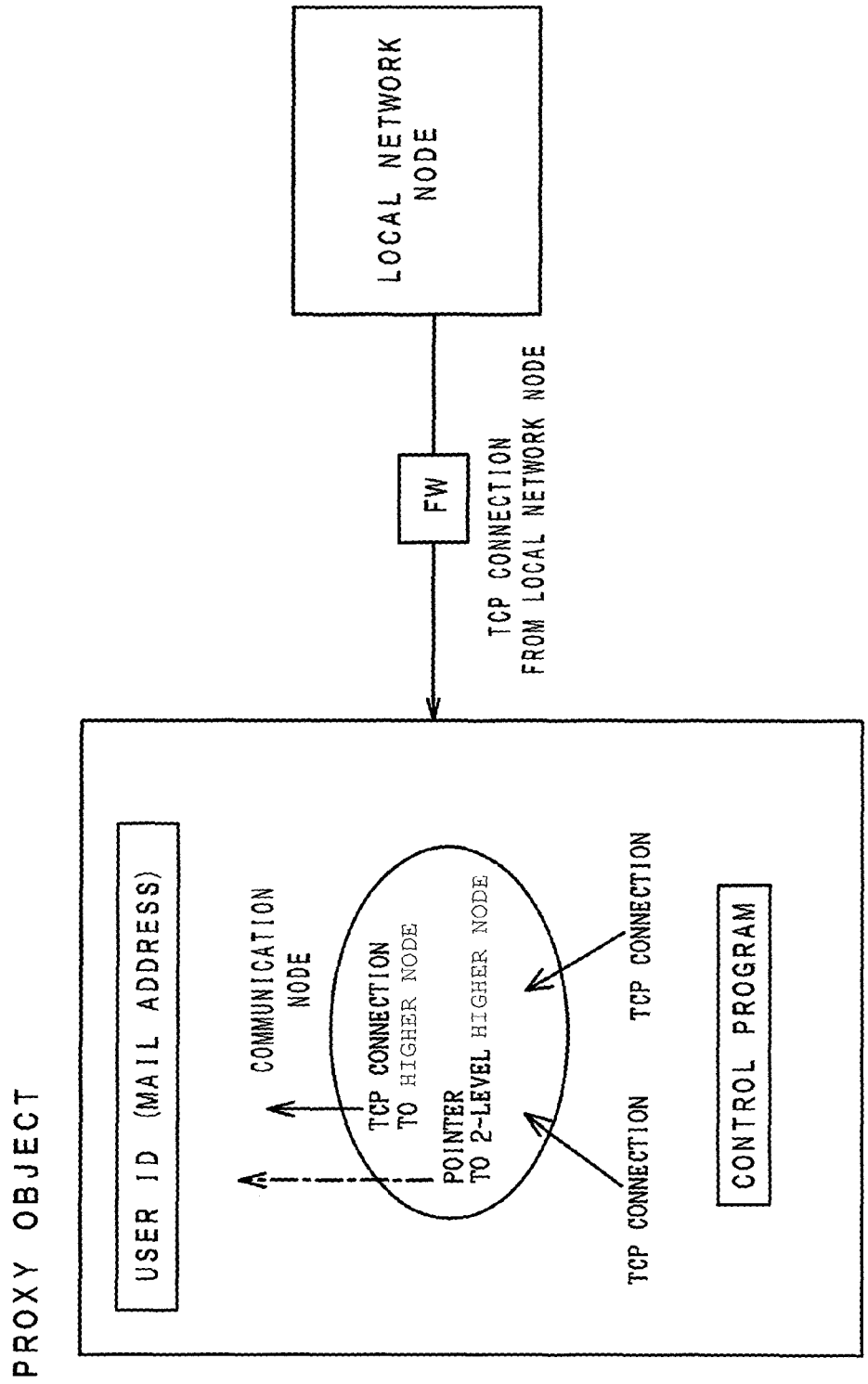
FIG. 5 is an illustration showing a data structure of a proxy object in the audio/video communication system according to a preferred embodiment of the present invention.

An audio/video communication system according to preferred embodiments of the present invention is described with reference to the accompanying drawings.

Basic Operation

A software program for a terminal of the communication system according to a preferred embodiment of the present invention is preferably installed in a personal computer, for example. Otherwise, a terminal (a mobile terminal, a broadband router or the like) installed with the software program is prepared. Then, user registration and other initial settings are carried out. It is not necessary for a user to discriminate a local address and a global address from each other. Next, the terminal is started, and thereby, the terminal comes to a "stand-by" state. When the user closes the software program or when the terminal is powered off, the terminal comes out of the stand-by state.

Basic Call

First, with a terminal in a stand-by state, a user (a caller) designates an ID (for example, an e-mail address) of a person to communicate with (an answerer) and clicks a "CALL" button. If the terminal of the answerer is in a stand-by state, the answerer's terminal will make a call sign (a sound or a display, for example). If the line is busy, the caller's terminal causes a display to inform the caller that the line is busy, and the answerer's terminal causes a display to inform the answerer that the terminal has had a call. In this moment, if the answerer's terminal is set to display the addresses of callers, the answerer's terminal displays the address of the caller.

When the answerer clicks an "ANSWER" button, the telephone is put through, and a videophone connection between the caller and the answerer is made. A button for commanding not to send video data may be provided. Then, when a "HANG UP" button is clicked, the phone connection is cut, and the terminals return to the stand-by state.

Group Call

When a user makes a call to another user, if the line is busy, the caller's terminal causes a display to indicate that the line is busy, and the answerer's terminal causes a display to indicate that the terminal has had a call. In this moment, if the caller's terminal is set to send its own address to answerers, the answerer's terminal displays the address of the caller. Then, if the answerer clicks the "ANSWER" button, the caller joins in the conversation.

The limit of the number of terminals that can join in a conversation is designed to be 100 or more. If all the terminals have the same processing speed and the same data transfer rate, the conversation will have a delay of O(log N), in which N is the number of terminals. Accordingly, even if the number of terminals joining in a conversation increases from 10 to 100, the delay will be only double.

While three or more people are in a conversation over the communication system according to the present preferred embodiment, when one person who is not the root node clicks the "HANG UP" button, only that person will be disconnected from the conversation. While two people are talking over the communication system, when either of the people clicks the "HANG UP" button, the conversation ends.

Relay

A person A makes a call to a person B, and the person B can connect the person A to another person C. First, the person A calls to the person B, and when the person B clicks the "ANSWER" button, the persons A and B can communicate with each other. Then, at the request of the person A, the person B makes a call to the person C by designating the user ID of the person C and by clicking the "CALL" button. In this moment, the person B can set his/her terminal to such a state that the person A cannot overhear the conversation between the person B and the person C.

When the person C clicks the "ANSWER" button, the person B and the person C can communicate with each other. If the person C consents to talk to the person A, the person B sets his/her terminal to such a state that the person A can join in the conversation. Thereafter, when the person B clicks the "HANG UP" button, the person B gets out of the conversation, and the conversation becomes only between the person A and the person C. In this way, a call is relayed between terminals.

Elements of the Communication System

In the communication system according to a preferred embodiment, as FIG. 4 shows, a terminal (a software program for a communication terminal) has a data structure including:
  a user ID that corresponds to a telephone number and that is expectedly an e-mail address;
  a node pointer cache wherein pointers (user IDs, IP addresses and port numbers) to other nodes are stored, initially being empty;
  a stand-by node that is identified by an IP address and a port number;
  a communication node that is identified by an IP address and a port number;
  a set of proxy objects, being initially null;
  a back-up of a set of proxy objects in a left (first) lower node, being initially null;
  a back-up of a set of proxy objects in a right (second) lower node, being initially null;
  a socket to be connected to a proxy object, being vacant initially and being used when the terminal is in a local network;
  a socket to be connected to a back-up of the proxy object, being vacant initially and being used when the terminal is in a local network; and
  a control program.

Proxy Object

When a terminal in a local network (local network terminal) is to participate in the communication system according to a preferred embodiment, a proxy object set in a node of a global network works as a substitute for the local network terminal. Thus, such proxy objects permit local network terminals to join in the communication system across NAT/firewalls, for example.

As FIG. 5 shows, a proxy object that has a data structure including:
  a user ID of the corresponding local network terminal, being expectedly a user's mail address;
  a socket connected to the corresponding local network terminal;
  a communication node that is identified by an IP address and a port number; and
  a control program.

Stand-by Group

Figure 6:
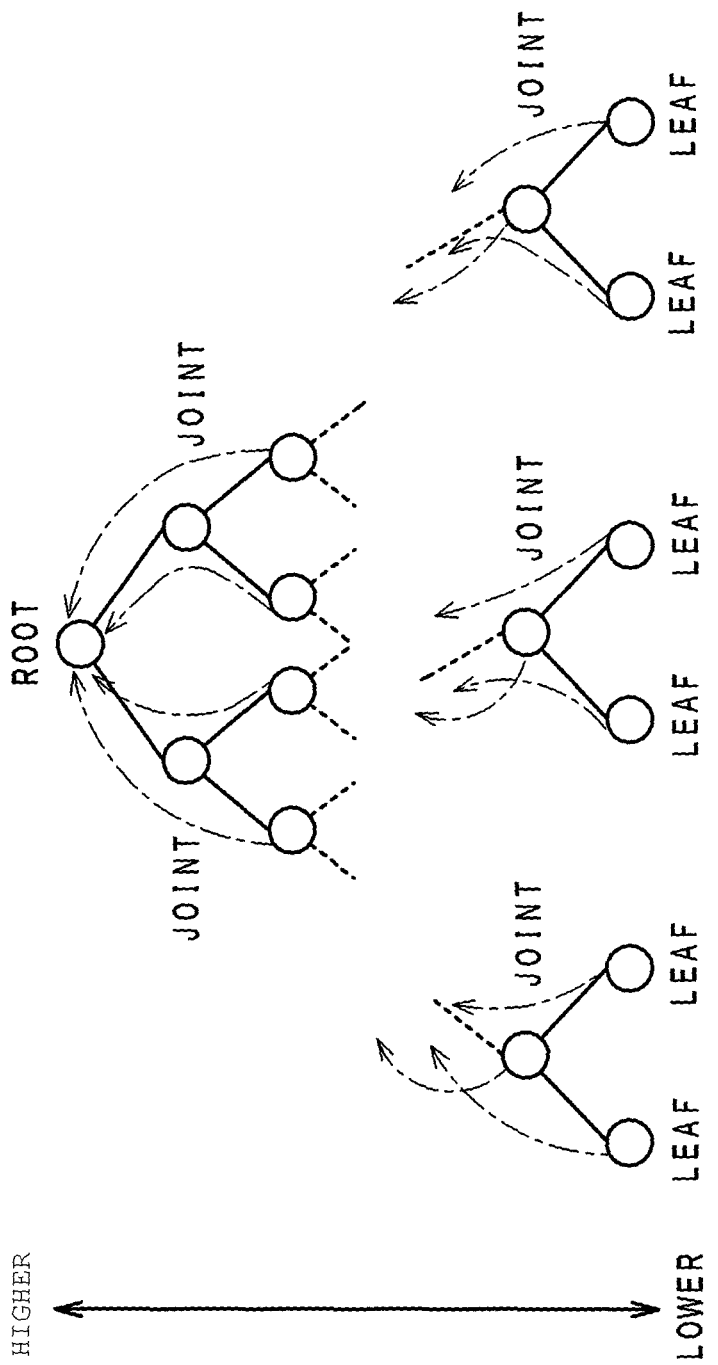
FIG. 6 is an illustration showing a balanced binary tree structure of the audio/video communication system according to a preferred embodiment of the present invention.

As FIG. 6 shows, a stand-by group is a group of stand-by nodes connected to one another by TCP connection in a balanced binary tree structure. In the balanced binary tree structure, all leaf nodes are positioned at almost the same distance from a root node.

When a terminal enters a stand-by state, the stand-by node of the terminal becomes one of the nodes defining a stand-by group as a tree. The mechanism to connect the nodes into a balanced binary tree structure will be described later. This structure eliminates the necessity of using a group manager, which is necessary in the above-mentioned electronic chalkboard system, and eases the limit on the number of nodes in the group. When a node on a joint level has trouble, it is possible to replace the node with another node. This will be described later.

In FIG. 6, each alternate long and short dashed arrow shows that the node where the arrow emerges has information on the node (two-level higher node) where the arrow is directed. Other lines show TCP connection.

Figure 7:
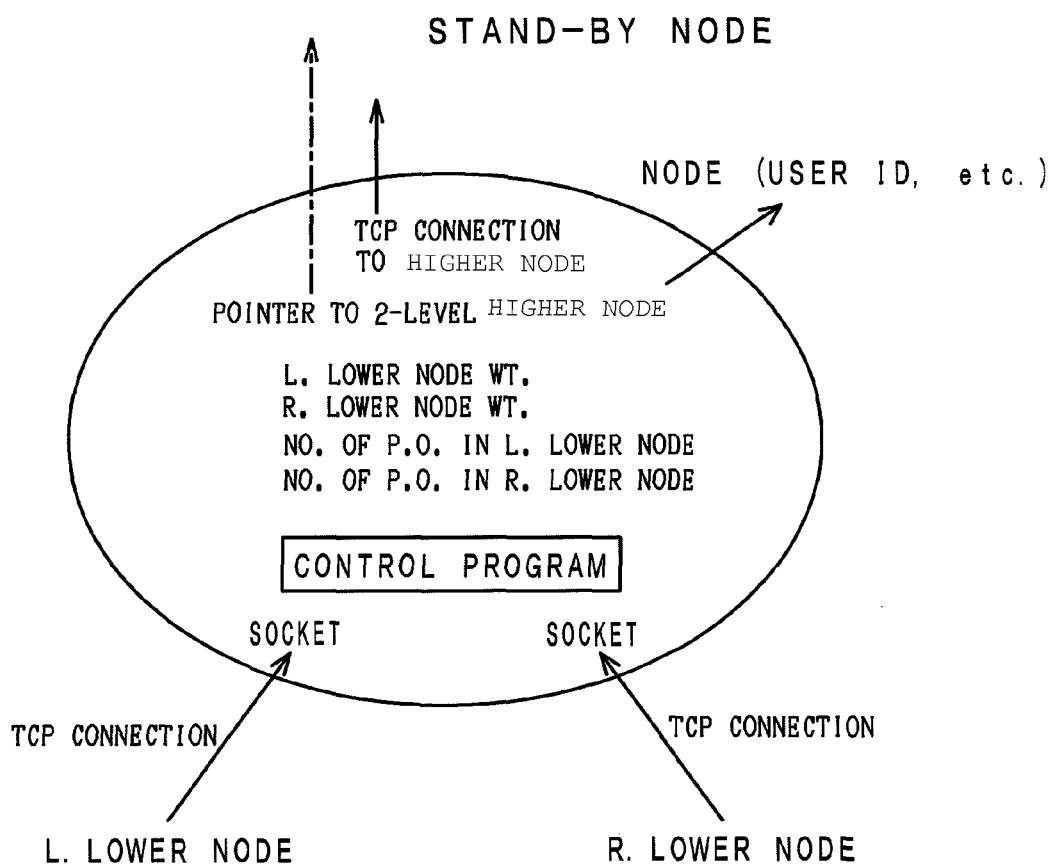
FIG. 7 is an illustration showing a data structure of a stand-by node of each node in the audio/video communication system according to a preferred embodiment of the present invention.

As FIG. 7 shows, each stand-by node has a data structure including:

a pointer to a node including itself, pointing out a user ID;
  a TCP socket that is connected to an higher node, being vacant if the node is the root node;
  a left lower node socket to be connected to a left lower node, being initially vacant and kept vacant while the node is a leaf node;
  a right lower node socket to be connected to a right lower node, being initially vacant and kept vacant while the node is a leaf node;
  a pointer to a two-level higher node, pointing out an IP address and a port number of the two-level higher node, the pointer being null if the node is the root node or a node directly connected to the root node;
  a left lower node weight indicating the number of lower nodes diverging from the left lower node socket, being initially zero;
  a right lower node weight indicating the number of lower nodes diverging from the right lower node socket, being initially zero;
  a value indicating the number of proxy objects stored in the immediate left lower node directly connected to the left lower node socket, being initially zero; and
  a value indicating the number of proxy objects stored in the immediate right lower node directly connected to the right lower node socket, being initially zero; and
  a control program.

Communication Group

A communication group is a group of communication nodes of terminals that are now in communication with one another, and the communication nodes of the communication group are connected to one another also in a balanced binary tree structure as shown by FIG. 6. Data sent from a node in a communication group are received by all the other nodes in the communication group. It is possible to form plural communication groups in one stand-by group. The structure and the management of a communication group are the same as those of the stand-by group.

Figure 8:
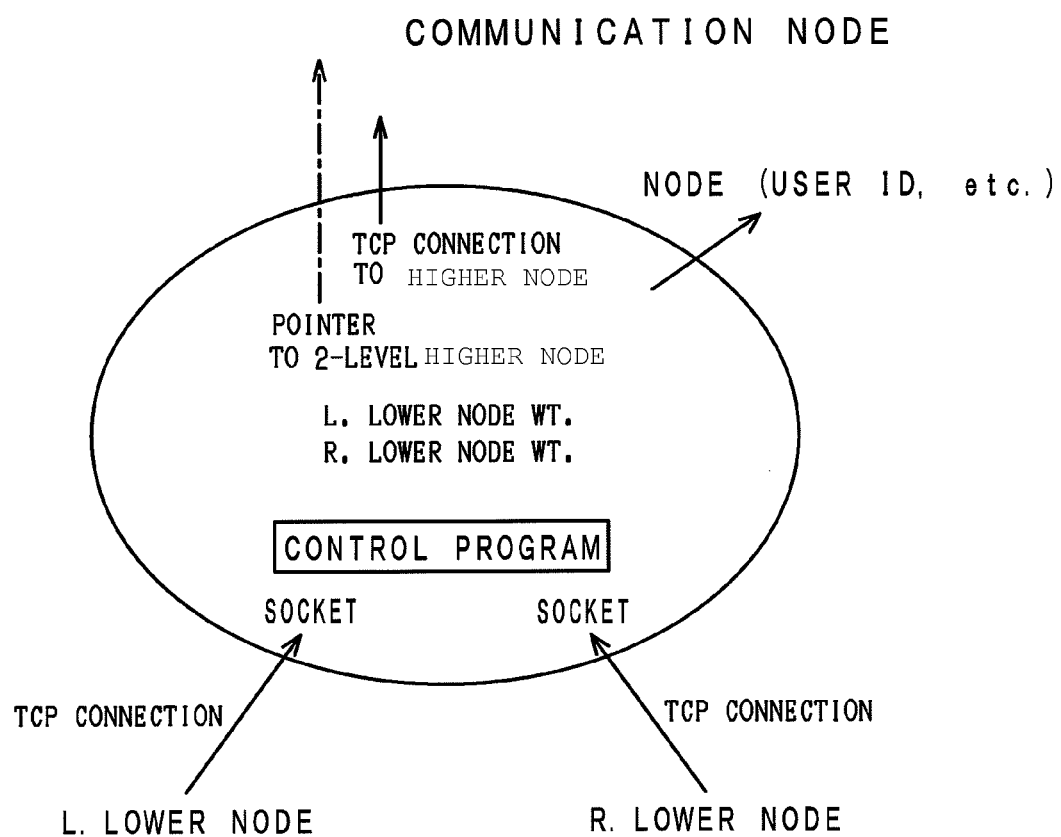
FIG. 8 is an illustration showing a data structure of a communication node of each node in the audio/video communication system according to a preferred embodiment of the present invention.

As FIG. 8 shows, each communication node has a data structure including:

a pointer to a node including itself, pointing out a user ID;
  a TCP socket that is connected to an higher node, being initially vacant and if the node is the root node;
  a left lower node socket to be connected to a left lower node, being initially vacant and kept vacant while the node is a leaf node;
  a right lower node socket to be connected to a right lower node, being initially vacant and kept vacant while the node is a leaf node;
  a pointer to a two-level higher node, pointing out an IP address and a port number of the two-level higher node, the pointer being initially null;
  a left lower node weight indicating the number of lower nodes diverging from the left lower node socket, being initially zero;
  a right lower node weight indicating the number of lower nodes diverging from the right lower node socket, being initially zero; and
  a control program.

Figure 9:
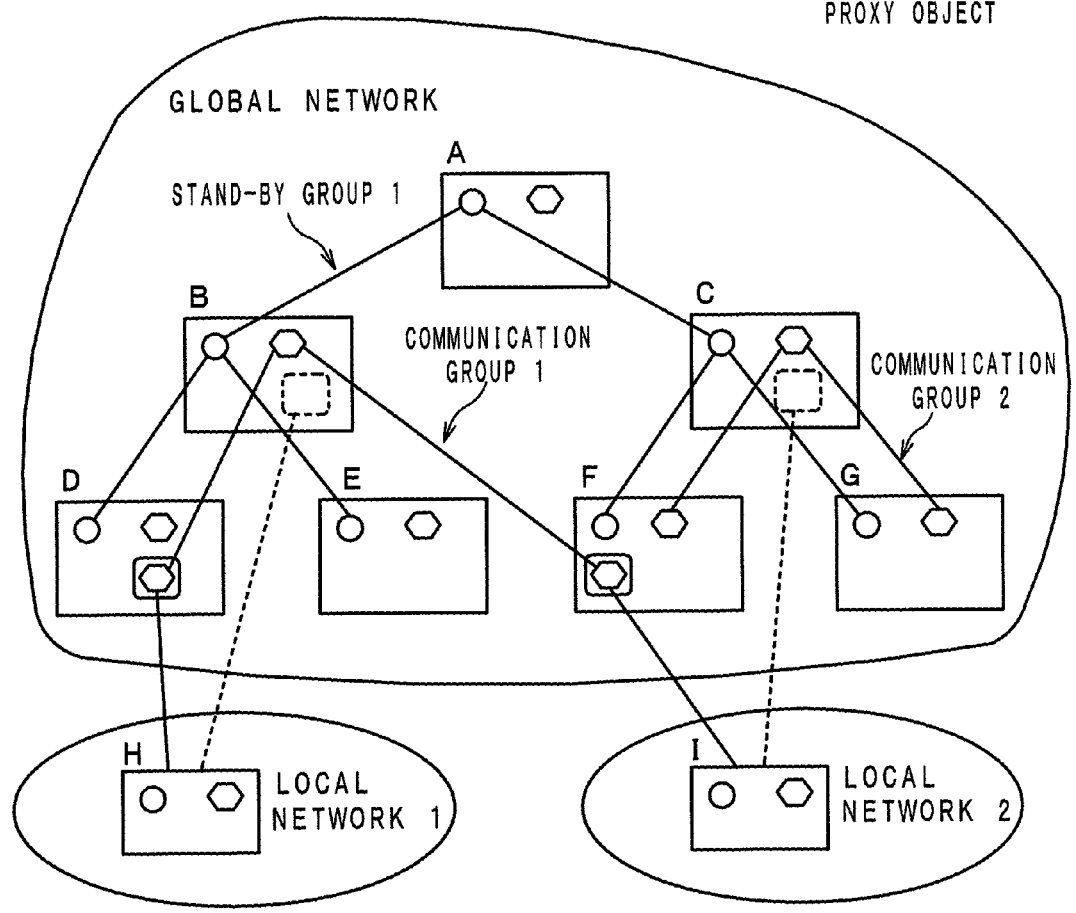
FIG. 9 is an illustration showing an example in which nine terminals form a stand-by group and two communication groups.

FIG. 9 shows an example of a state wherein a stand-by group and two communication groups are arranged in the communication system. In FIG. 9, terminals A-G are global network terminals, and terminals H and I are local network terminals. The stand-by nodes of the terminals A-G are interconnected to define a stand-by group. The terminal D has a proxy object for the local network terminal H, and the terminal B has a back-up of the proxy object. The terminal F has a proxy object for the local network terminal I, and the terminal C has a back-up of the proxy object. The communication node of the terminal B and the respective communication nodes of the local network terminals H and I are interconnected to define a communication group 1 via the proxy objects, and the terminals B, H and I are in communication with one another. The respective communication nodes of the terminals C, F and G are interconnected to define a communication group 2, and the terminals C, F and G are in communication with one another.

Stand-by Group Construction Method

An association to manage the communication system is defined as an initial stand-by group. Specifically, three terminals with global addresses are started and connected into a binary tree structure. Then, the IP address of the root node is disclosed directly or indirectly on the Internet or the like for user management.

Figure 10:
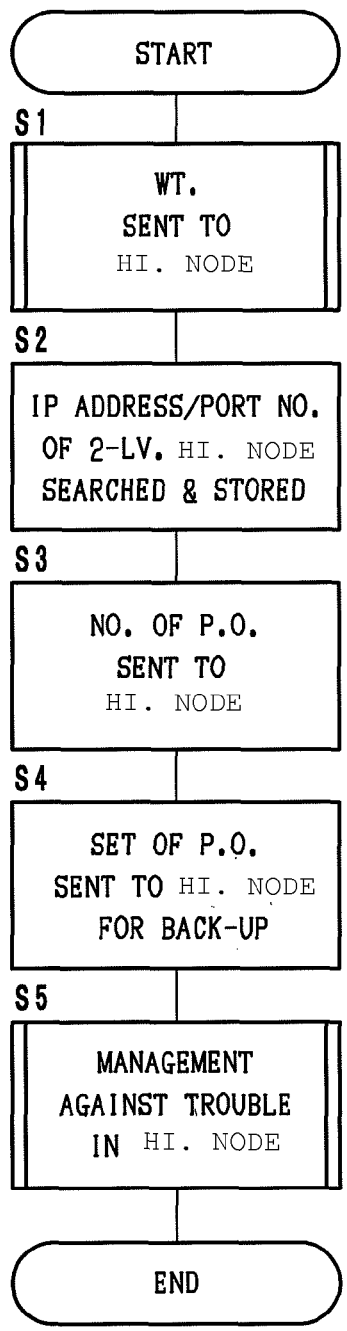
FIG. 10 is a flowchart showing a processing carried out at regular time intervals for maintaining a balanced binary tree structure.
Figure 11:
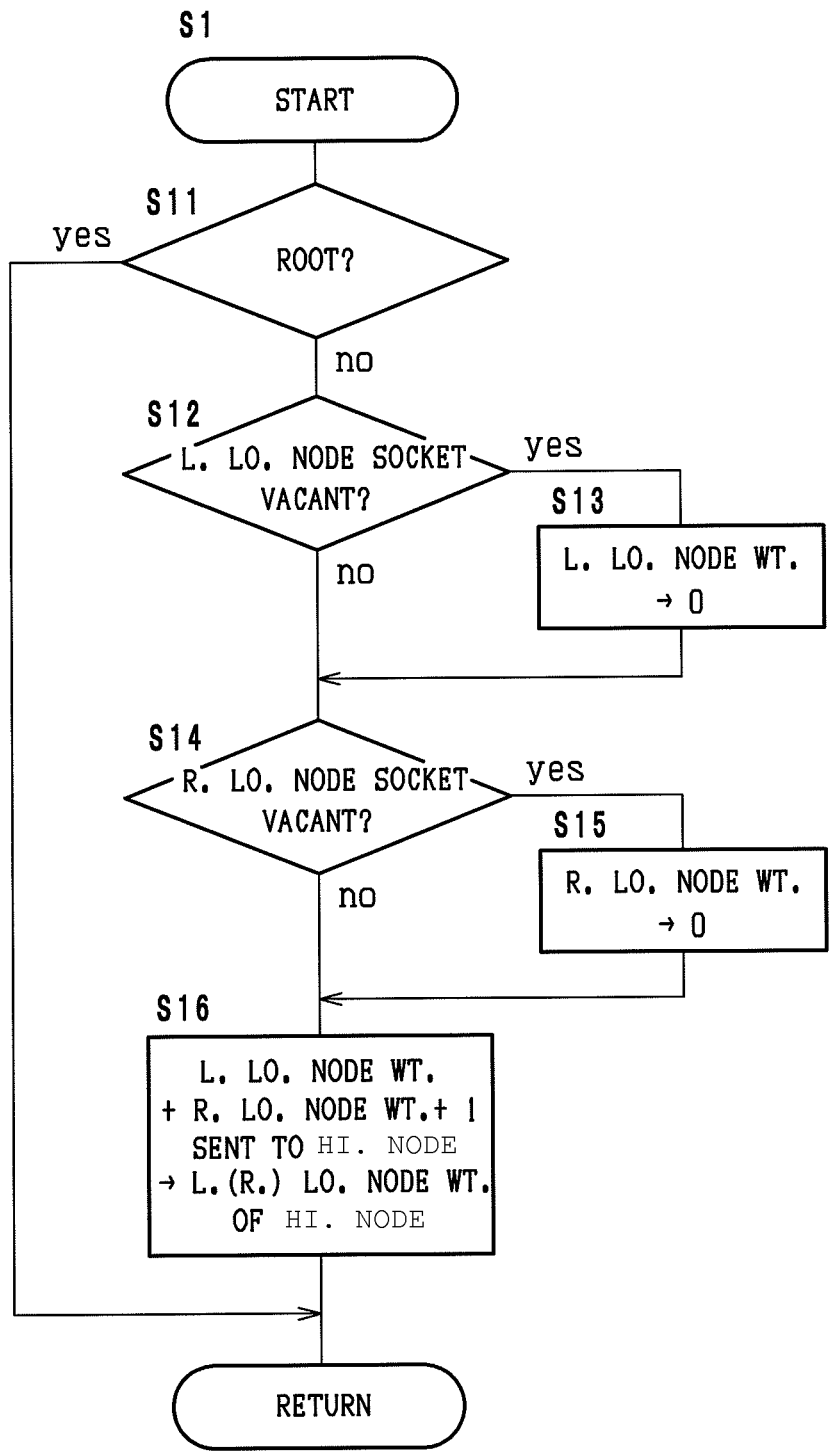
FIG. 11 is a flowchart showing a processing carried out by each node for calculating a total weight of right and left lower nodes and sending the total weight to its higher node.
Figure 12:
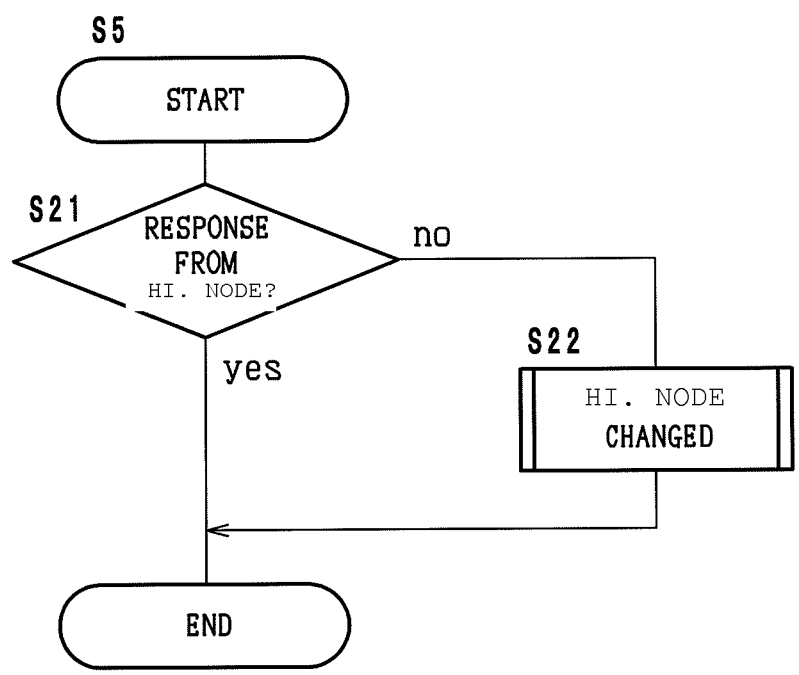
FIG. 12 is a flowchart showing a processing carried out when a node has no response from its higher node.

Every stand-by node in the stand-by group executes processing as shown by FIGS. 10-12 at regular time intervals.

At step S1, each stand-by node calculates its own weight by adding "1" to the sum of the "weights" of the two lower nodes connected thereto and sends the calculated weight to the higher node (see step S16). If the node is the root of the stand-by group (YES at step S11), the node does not send the weight. If the node does not have any lower nodes (YES at steps S12 and S14), the weight of the lower nodes connected thereto is "0" (at steps S13 and S15).

At step S2, the node searches for an IP address and a port number of its two-level higher node from itself, and the obtained IP address and port number are stored therein. If its one-level higher node has trouble, the node communicates with the two-level higher node to restore the group. The restoration will be described later. If the node is the root node or a node directly connected to the root node, "null" is stored as the IP address and the port number of the two-level higher node.

At step S3, the node sends the number of proxy objects stored therein to its higher node.

At step S4, the node sends a set of proxy objects stored therein to the higher node, and the higher node makes a back-up of the set of proxy objects. The local network nodes covered by the proxy objects have TCP connections to the back-up also.

If the node receives no response from the higher node (steps S5 and S21), it is judged that the higher node has trouble, and the higher node is replaced with a new one (step S22). The replacement will be described later.

Figure 13:
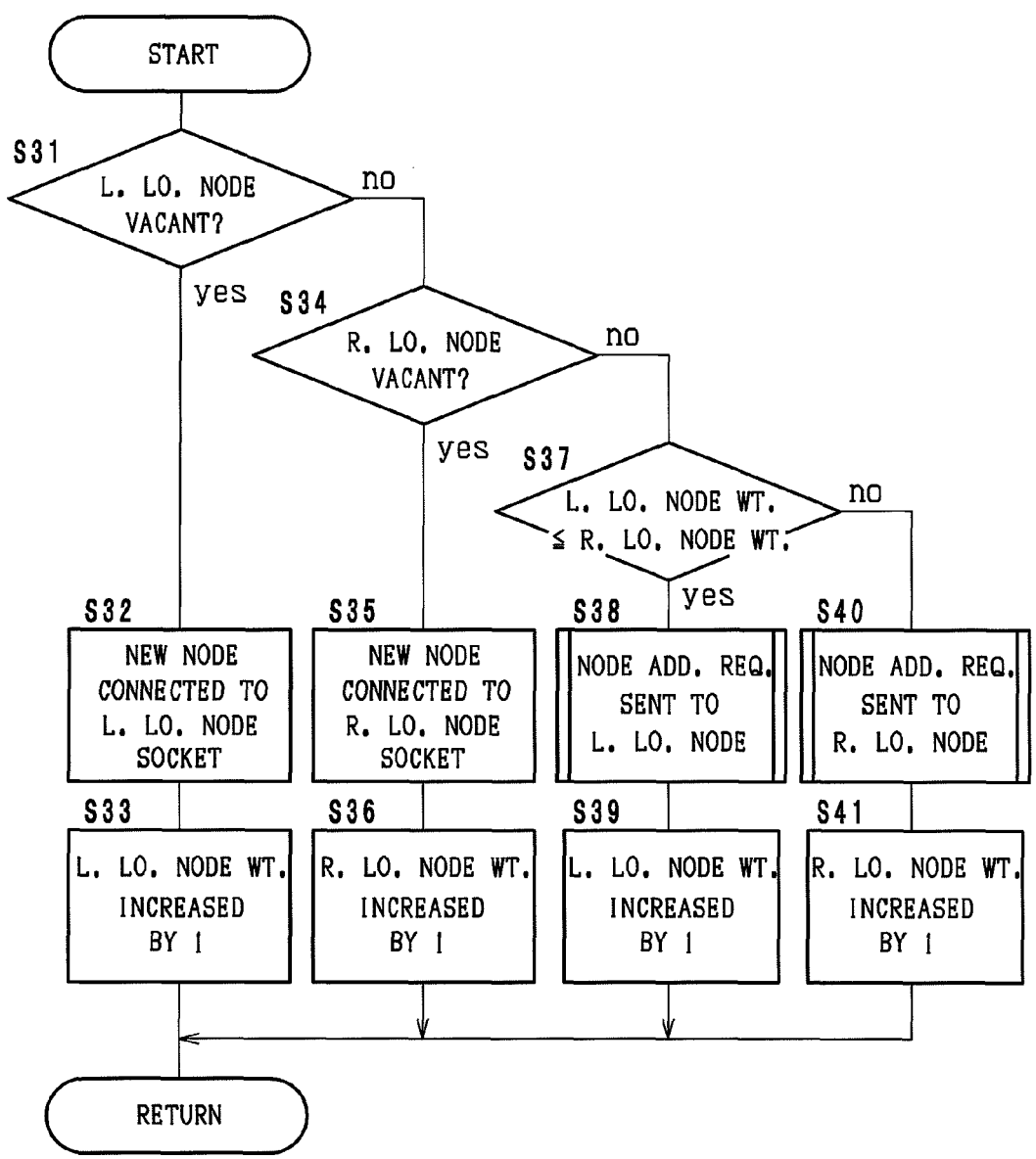
FIG. 13 is a flowchart showing a processing for an addition of a new node.

When a terminal with a global address is to newly join in the stand-by group, processing as shown by FIG. 13 is executed. In this moment, the right lower node socket and the left lower node socket of the stand-by node of the new terminal are vacant.

The terminal makes a request to the root node of the stand-by group for an addition of a new node.

When a node in the stand-by group receives a request for an addition of a new node, the node executes the following processing. If the left lower node socket thereof is vacant (YES at step S31), the node links its left lower node socket with the new node (step S32), and the node increases the left lower node weight by one (step S33). If the left lower node socket of the node is occupied and if the right lower node socket of the node is vacant (YES at step S34), the node links its right lower node socket with the new node (step S35), and the node increases the right lower node weight by one (step S36). If both the left lower node socket and the right lower node socket thereof are occupied and if the left lower node weight is equal to or less than the right lower node weight (YES at step S37), the node passes the request for an addition of a new node to the left lower node (step S38), and the node increases the left lower node weight by one (step S39). If the left lower node weight is more than the right lower node weight (NO at step S37), the node passes the request for an addition of a new node to the right lower node (step S40), and the node increases the right lower node weight by one (step S41).

In this algorithm, a new node is integrated into the balanced binary tree structure of the stand-by group. Also, it takes only a time O(log N) for the integration of a new node into the stand-by group.

When a local network terminal is to newly join in the stand-by group, the local network terminal makes a request to the root node of the stand-by group for an addition of a new local network node. After the local network terminal has a reply from the root node, the terminal makes a TCP connection to an IP address and a port number included in the reply from the root node.

Figure 14:
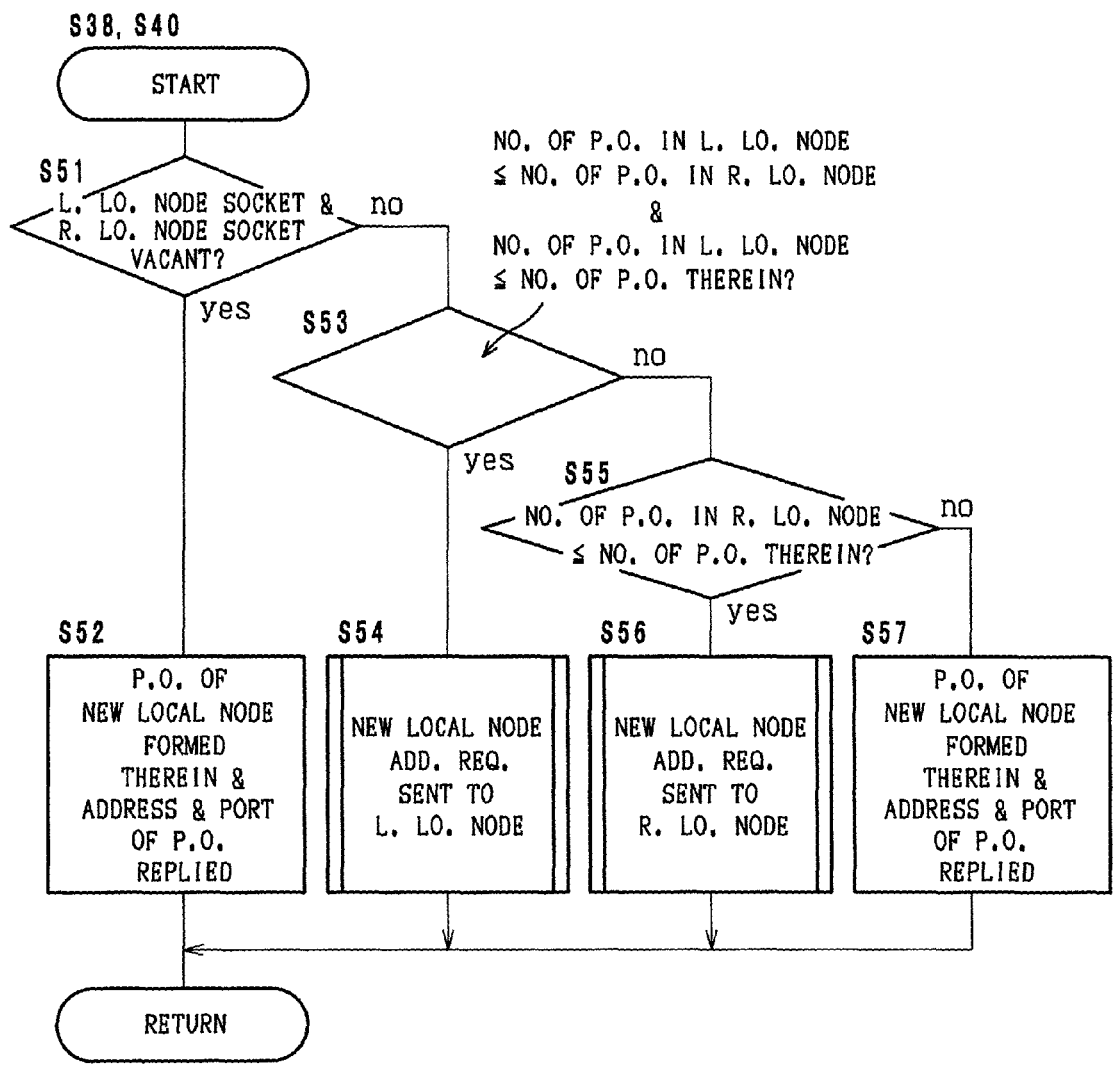
FIG. 14 is a flowchart showing a processing for an addition of a new local node.

When a node in the stand-by group receives a request for an addition of a new local network node, processing as shown by FIG. 14 is executed, and thereafter, the node sends the result as a reply.

If both the right lower node socket and the left lower node socket of the node are vacant (YES at step S51), the node adds a proxy object of the new local terminal to the set of proxy objects stored therein, and the node sends the IP address and the port number for the proxy object as a reply (step S52).

If at least one of the right lower node socket and the left lower node socket of the node is occupied (NO at step S51), the processing is executed as follows. If the number of proxy objects stored in its left lower node is equal to or less than the number of proxy objects stored in its right lower node and is equal to or less than the number of proxy objects stored in the node itself (YES at step S53), the node passes the request for an addition of a new local network node to the left lower node (step S54).

If the number of proxy objects stored in its right lower node is equal to or less than the number of proxy objects stored in the node itself (YES at step S55), the node passes the request for an addition of a new local network node to the right lower node (at step S56).

If the number of proxy objects stored in its right lower node is more than the number of proxy objects stored in the node itself (NO at step S55), the node adds a proxy object of the new local network terminal to the set of proxy objects stored therein, and the node sends the IP address and the port number for the proxy object as a reply (step S57).

In this algorithm, a proxy object of a local network terminal is added such that all nodes in the stand-by group will have almost the same number of proxy objects.

Calling

Figure 15:
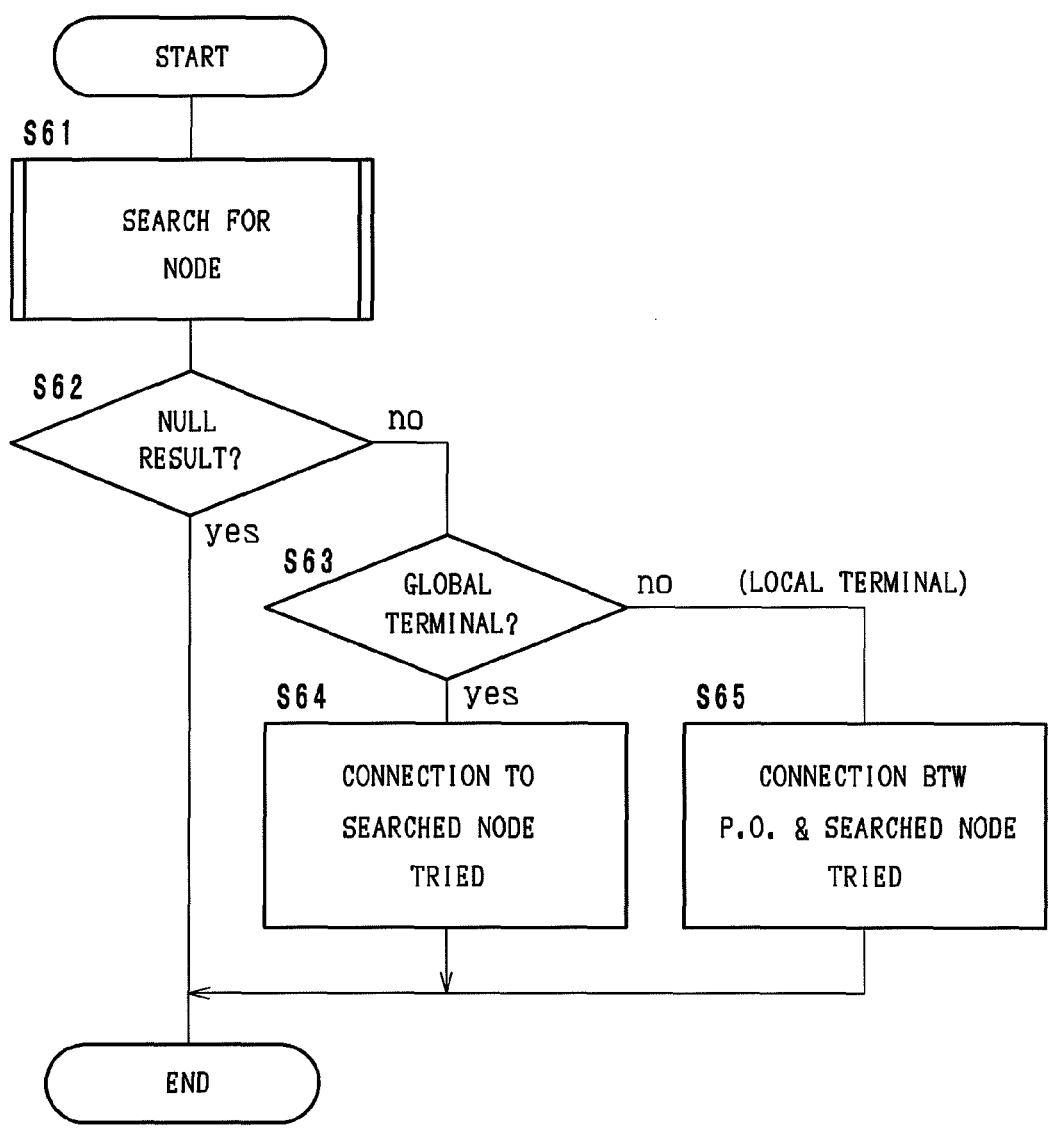
FIG. 15 is a flowchart showing a processing for calling a node.

In order to call another node, processing shown by FIG. 15 is executed. First, a search for a node to communicate with (an answerer) is performed at step S61. If the result of the search is null (YES at step S62), the terminal displays that the answerer could not be found, and the processing is completed. Otherwise, the processing continues as follows.

When the caller's terminal is a global network terminal (YES at step S63), the terminal tries to make a connection between its own communication node and the communication node of the answerer's terminal with the latter node serving as the root node (step S64).

When the caller's terminal is a local network terminal (NO at step S63), the terminal tries to make a connection between the communication node of its proxy object and the communication node of the answerer with the latter node serving as the root node (step S65).

Search for a Node

Figure 16:
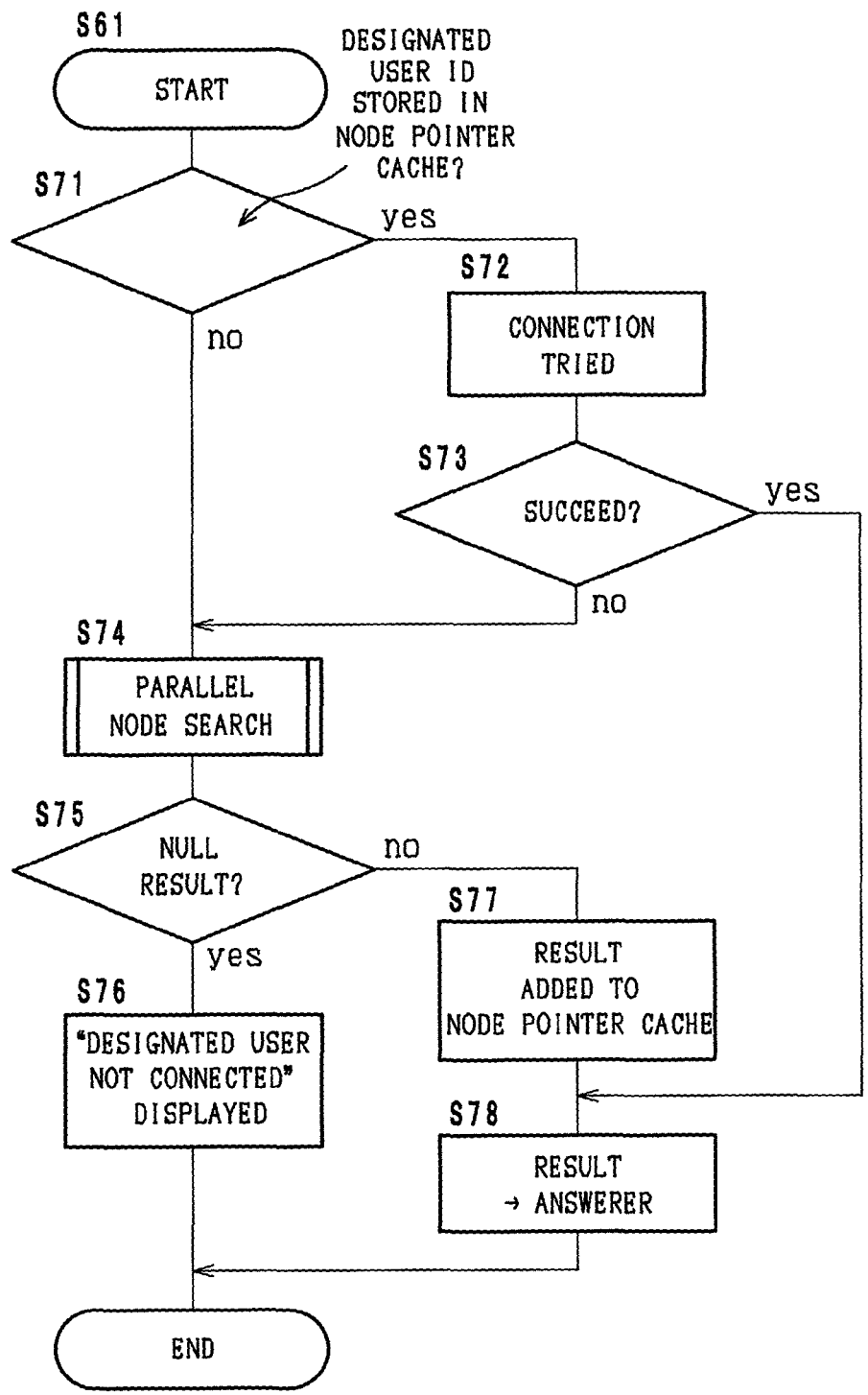
FIGS. 16, 17 and 18 are flowcharts showing a processing for a search for a node.

A search for a node is a first processing that is executed when a terminal calls another node, and the processing is finding out where the node to communicate with (the node with a designated user ID) is located. The search for a node is executed as shown by FIG. 16.

First, the terminal searches its node own pointer cache for information about the node with the designated user ID. If the node pointer cache stores information about the node (YES at step S71), the terminal tries to make a connection to the node (step S72). Then, when the connection is successfully made (YES at step S73), the node becomes an answerer (step S78). Since every terminal has a node pointer cache, the load on the stand-by group for search for a node is lightened.

If the node pointer cache of the terminal itself does not have information about the node with the designated user ID (NO at step S71), the terminal requests the root node of the stand-by group for a parallel search for the node (step S74). When the terminal receives a result other than null from the root node (NO at step S75), the terminal adds the result to its own node pointer cache (step S77), and the searched node becomes an answerer (step S78). If the terminal receives a result that is null from the root node (YES at step S75), the terminal displays that the designated node is not connected to the network (step S76).

Figure 17:
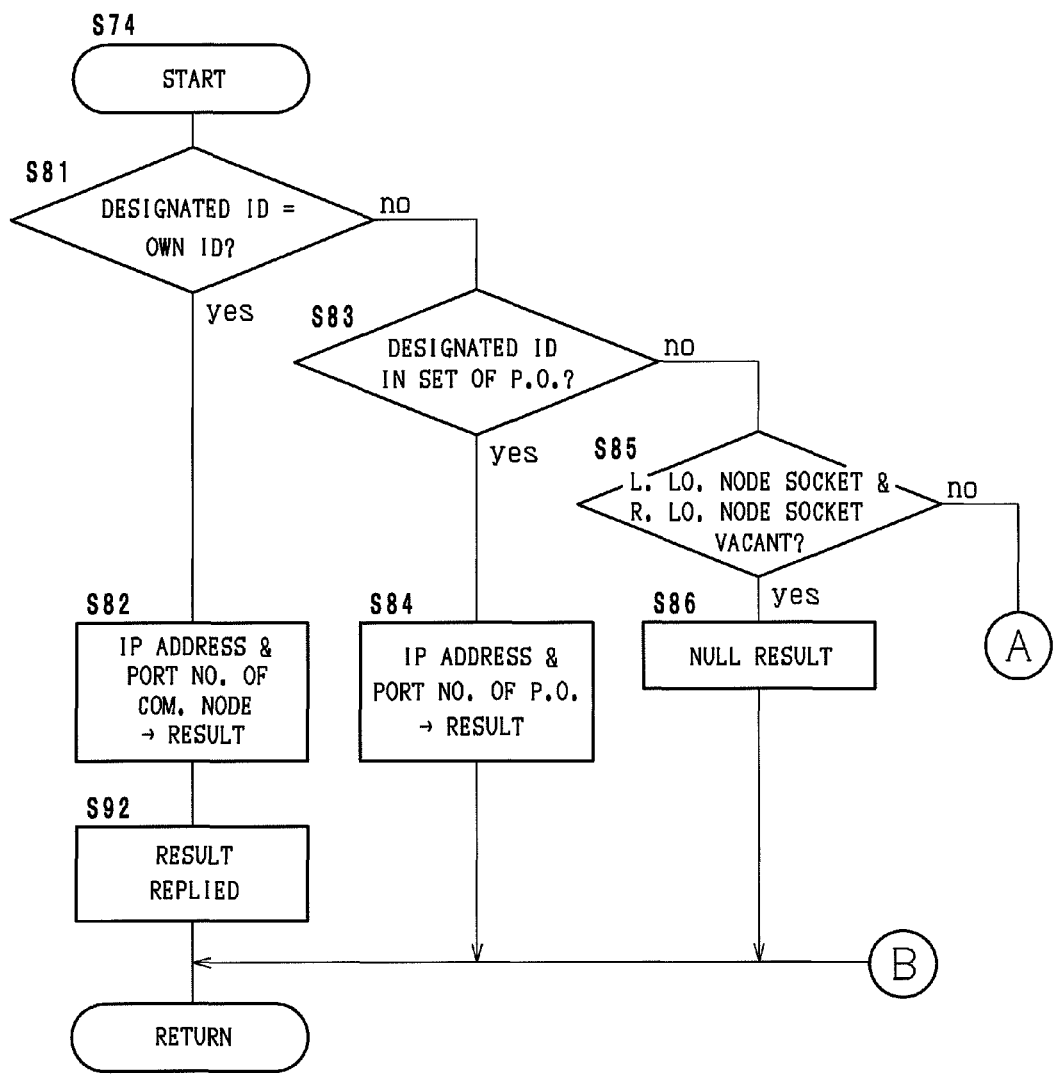
Figure 18:
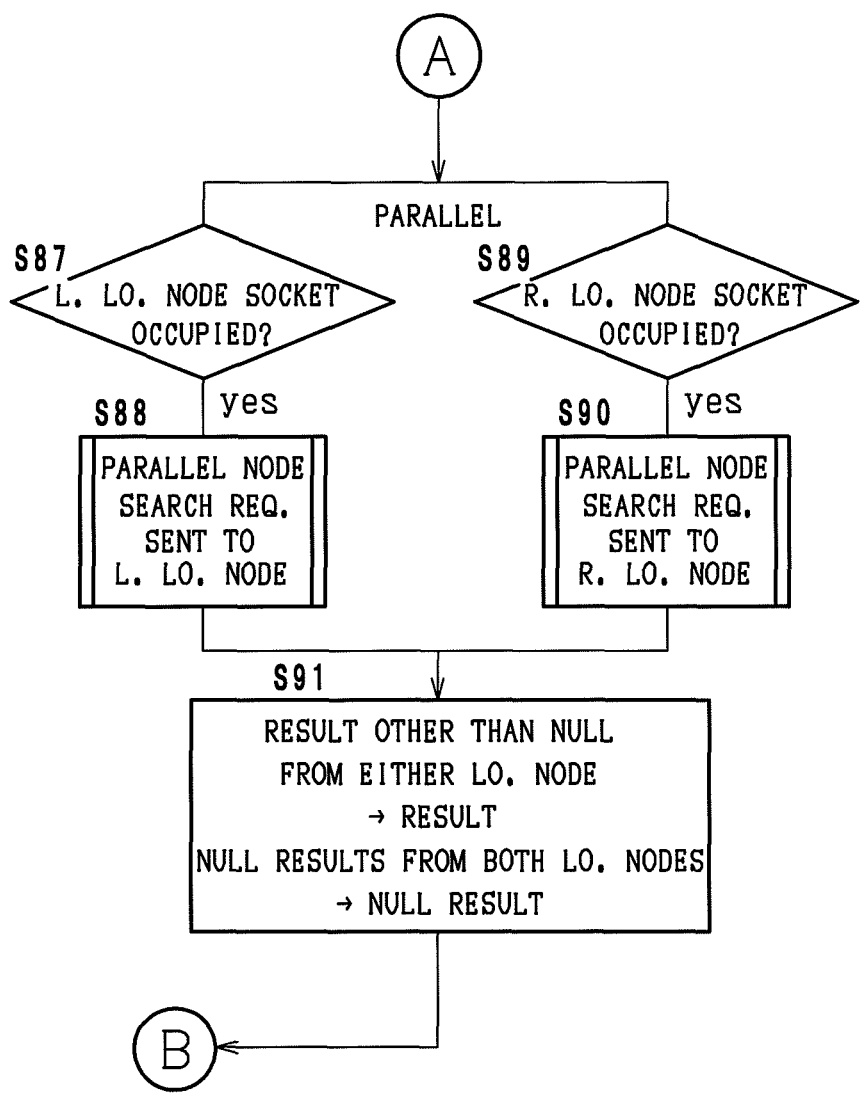

When a parallel node search in a stand-by group is requested, a processing as shown by FIGS. 17 and 18 is executed, and a result is returned to a node that made the request.

If a node in the stand-by group has a user ID that corresponds to a designated address (YES at step S81), the node returns a result indicating the IP address and the port number of the communication node thereof (steps S82 and S92).

If the node has a proxy object with the designated address (YES at step S83), the node returns a result indicating the IP address and the port number of the proxy object (steps S84 and S92).

In cases other than the cases above, if the right and left lower node sockets of the node are both vacant (YES at step S85), the node returns a result indicating null (steps S86 and S92).

Otherwise (NO at step S85), if the left lower node socket is occupied (YES at step S87), the node passes the request for a parallel node search to its left lower node (step S88). If the right lower node socket is occupied (YES at step S89), the node concurrently passes the request to its right lower node (step S90).

Then, the node waits for replies from the right and left lower nodes. If the node has a reply indicating a result other than null, the node sends the result as its own reply. If the replies from the right and lower nodes are both null, the node replies a null result (steps S91 and S92).

Communication Processing

When the communication node of a terminal receives a request for connection from another node, the following processing is executed.

The terminal makes a sound and a display to inform the user that the terminal has received a request for connection.

After the user clicks an answer button, a communication group is constructed such that the communication group includes the node that made a request for connection and that the communication node of the terminal that received the request becomes the root node, based on the following communication group construction method.

Communication Group Construction Method

Every node participating in a communication group executes the following processing at regular time intervals.

A node in a communication group calculates its own weight by adding "1" to the sum of the "weights" of the two lower nodes connected thereto. Then, the node sends information about its own weight to its higher node. If the node is the root node, the node does not send the weight information. If the node does not have any lower nodes, the sum of the weights of the lower nodes is "0".

The node searches for its two-level higher node and stores the IP address and the port number of the two-level higher node. If the one-level higher node has trouble, the node will make contact with the two-level higher node to restore the communication group. The restoration will be described later. If the node is either the root node or a node directly connected to the root node, the node stores "null" as the two-level higher node.

If the node has no response from its one-level higher node, it is judged that the one-level higher node has trouble, and a processing for changing the one-level higher node is executed. This processing will be described later.

When a communication node of a terminal is to newly participate in a communication group, the following processing is executed. In this moment, the right and left lower node sockets of the new node are vacant.

The new node makes a request to the root node of the communication group for an addition of a new node.

When a node in the communication group receives a request for an addition of a new node, if the left lower node socket of the node is vacant, the node connects the new node to the left lower node socket as its left lower node.

If the left lower node socket of the node is occupied and if the right lower node socket of the node is vacant, the node connects the new node to the right lower node socket as its right lower node.

If the right and left lower node sockets of the node are both occupied and if the left lower node weight is equal to or less than the right lower node weight, the node passes the request for an addition of a new node to its left lower node, and the node increases the left lower node weight by "1".

If the left lower node weight is greater than the right lower node weight, the node passes the request for an addition of a new node to its right lower node, and the node increases the right lower node weight by "1".

In this algorithm, a new node is integrated into the balanced binary tree structure of the communication group. Further, it takes only a time O(log N) for the integration of a new node into the communication group.

Communication Processing of a Proxy Object

There is one-to-one correspondence between proxy objects and local network terminals. Information received by a proxy object is transmitted to the corresponding local network terminal, and information sent from a local network terminal is transmitted to the corresponding proxy object. In this way, the local network terminals in the communication system can perform communication as global network terminals do.

Each proxy object exchanges information with the corresponding local network terminal at regular time intervals, and likewise, the back-up of the proxy object exchanges information with the corresponding local network terminal. If the proxy object does not respond, the back-up of the proxy object substitutes for the proxy object of the corresponding local network terminal.

If the back-up of the proxy object as well as the proxy object does not respond, the processing for adding the corresponding local network terminal to the stand-by group is executed. When a local network terminal does not respond, the proxy object of the local network terminal is deleted.

Management Against Node Trouble

A management against node trouble as described below is substantially a change of nodes, and the management is for both a stand-by group and a communication group.

Figure 19:
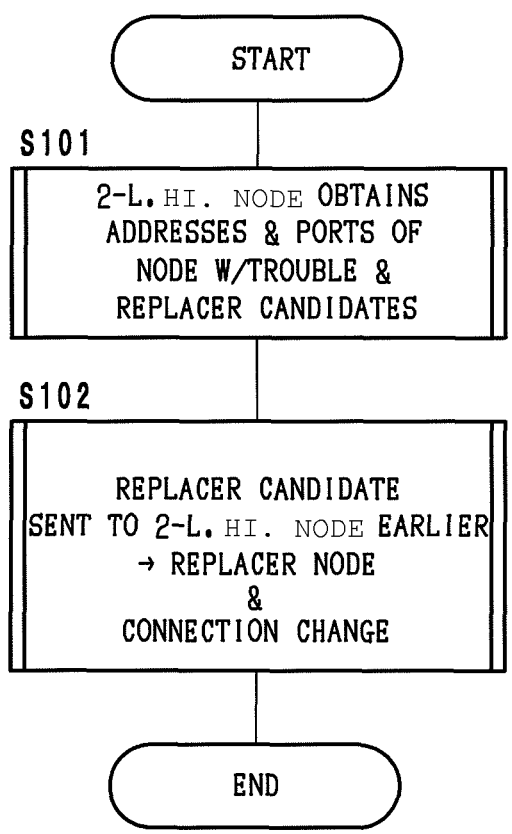
FIG. 19 is a flowchart showing a processing for replacement of an higher node.
Figure 20:
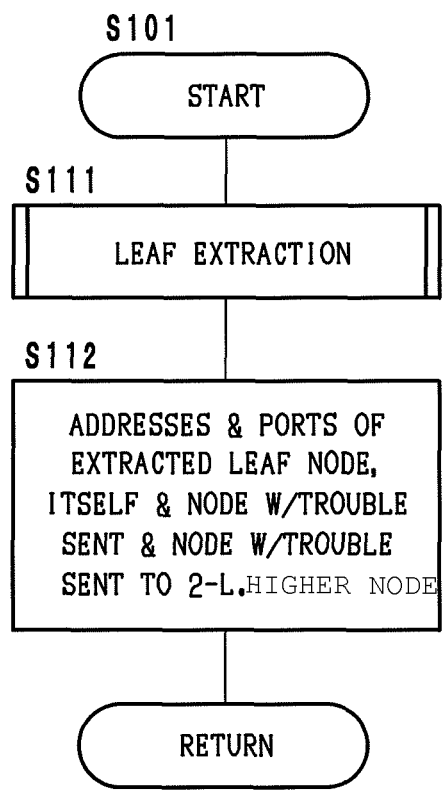
FIG. 20 is a flowchart showing a processing for obtaining a candidate for a replacer node, the processing carried out when trouble has occurred.

When a node has no response from its higher node at a regular time of exchanging information among nodes, it is judged that the higher node has trouble, and a node change processing is executed as shown by FIGS. 19 and 20. If a two-level higher node from the node receives inquiries and requests during the node change processing, the inquiries and requests are left unanswered, and after the node change processing, the inquiries and requests are responded to.

The two-level higher node obtains the IP address and the port number of the higher node (a one-level lower node of the two-level higher node or the node having trouble) and information about a candidate for a replacer node (step S101) in the following way.

The node that has no response from its one-level higher node executes a leaf extraction processing as will be described later (step S111), and the node sends the result of the leaf extraction processing to the two-level higher node as a candidate for a replacer node, together with the IP address and the port number of the node itself and the IP address and the port number of the higher node (step S112).

The two-level higher node designates a candidate sent thereto earlier as the replacer node. The two-level higher node obtains information about the right and left lower nodes of the node having trouble as well as the result of the leaf extraction processing and executes a connection change processing as described later (step S102).

The weight of the tree decreases by one at the site where the node change processing is executed, and the tree may lose its balance. However, on and after the time O(log N) for reflecting the change in the weight to all the nodes, a node addition is executed such that the new node is positioned at a place where the weight is lighter. Thus, the balanced binary tree structure can be automatically maintained.

Leaf Extraction Processing

When trouble occurs either in a stand-by group or in a communication group, the leaf extraction processing is executed to change nodes. A node follows down its lighter branch, and when a leaf node is found, the leaf node is extracted as a candidate for the replacer node.

With the algorithm, a leaf node can be extracted within a time O(log N).

Connection Change Processing

Referring to FIGS. 21 and 22, the connection change processing is described. The replacer node is referred to as node A, the node to become a new higher node of the node A is referred to as node B, the node to become a new left lower node of the node A is referred to as node C, and the node to become a new right lower node of the node A is referred to as node B (step S131). By this time, the node B has obtained the IP addresses and the port numbers of the nodes A, C and D (step S132). The nodes C and D already sent their own IP addresses and port numbers to the node B when they informed the node B of the occurrence of the trouble. The node A is one of the candidates for the replacer node that the nodes C and D sent to the node B after the leaf extraction processing, and the node A is the one received by the node B earlier.

At step S133, if the node having trouble is the left lower node of the node B, the replacer node A is connected to the left lower node socket of the node B. If the node having trouble is the right lower node of the node B, the replacer node A is connected to the right lower node socket of the node B. Then, the node B delivers the nodes C and D to the node A (step S134).

Next, at step S135, the node C is connected to the left lower node of the node A, and the node D is connected to the right lower node of the node A. There are cases that the node(s) C and/or D are/is null. At step S136, if the nodes A and C are the same one node, the left lower node of the node A is null. When the nodes A and D are the same one node, the right lower node of the node A is null.

Node Change Processing

When a node has no response from its right or left lower node at a regular time of exchanging information among nodes, it is judged that the lower node has trouble, and a node change processing is executed as described below.

When the non-responsive lower node (the node having trouble) has a weight equal to or greater than 2, the node waits for a request for a node change processing sent from a two-level lower node. As soon as the node has received the request, the node executes a process for managing the trouble.

When the node having trouble has a weight smaller than 2, the node having trouble is a leaf node. The higher node from the non-responsive node has a back-up of the set of proxy objects stored in the non-responsive node, and in this case, the higher node transfers the back-up of the set of proxy objects into the set of proxy objects stored therein.

When a node has no response from any of its higher and lower nodes, the node makes a request for an addition of a new node so that the node can be newly incorporated into the stand-by group.

Others

By installing a software program for the inventive communication system in household broadband routers, a more stable communication system can be constructed. The household broadband routers have global addresses and are generally powered on all day.

By communication among the nodes in a stand-by group, updates of the software program are executed automatically. A system for managing organization can manage users by only managing the root terminal of a stand-by group and a terminal as a provision against trouble of the root terminal. By classifying the nodes in a stand-by group by the kind of address or the like, the load on each terminal for node search becomes lighter.

In constructing a communication group, if the root node, which is the called-up node, performs authorization, it is possible to make communication (broadcast) only among limited users.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An audio/video communication system, comprising plural network terminals, wherein
   each of the network terminals has a communication node used to participate in a communication group and a stand-by node used to participate in a stand-by group;
   every node in the communication group has a first lower node connector and a second lower node connector, and is arranged to store a first value indicating a number of nodes in a first side diverging from the first lower node connector and a second value indicating a number of nodes in a second side diverging from the second lower node connector;
   a new node is added to the communication group such that the first value and the second value stored in each node in the communication group will be substantially equal to each other, in order to automatically regulate connections among nodes in the communication group to define a balanced binary tree structure;
   data sent from a node in the communication group reaches all the other nodes in the communication group within a time in proportion to a logarithm of the number of nodes in the communication group;
   every node in the communication group sends a total number of lower nodes including itself to its higher node at regular time intervals; and
   the higher node stores the total number as the first value indicating the number of node in the first side diverging from the first lower node connector or the second value indicating the number of node in the second side diverging from the second lower node connector.

2. An audio/video communication system, comprising plural network terminals, wherein
   each of the network terminals has a communication node used to participate in a communication group and a stand-by node used to participate in a stand-by group;
   every node in the communication group has a first lower node connector and a second lower node connector, and is arranged to store a first value indicating a number of nodes in a first side diverging from the first lower node connector and a second value indicating a number of nodes in a second side diverging from the second lower node connector;
   a new node is added to the communication group such that the first value and the second value stored in each node in the communication group will be substantially equal to each other, in order to automatically regulate connections among nodes in the communication group to define a balanced binary tree structure;
   data sent from a node in the communication group reaches all the other nodes in the communication group within a time in proportion to a logarithm of the number of nodes in the communication group;
   every node in a stand-by group has a first lower node connector and a second lower node connector and stores a first value indicating a number of nodes in a first side diverging from the first lower node connector and a second value indicating a number of nodes in a second side diverging from the second lower node connector;
   a new node is added to the stand-by group such that the first value and the second value stored in each of the nodes in the stand-by group will be substantially equal to each other so that connections among nodes in the stand-by group are automatically regulated to define a balanced binary tree structure; and
   every node in the stand-by group further stores user information, and a search for a designated node is executed by checking the user information stored in the nodes in the stand-by group sequentially from the highest node down to lower nodes in parallel.

3. An audio/video communication system according to claim 1, wherein
every node in the communication group and in the stand-by group stores information about its two-level higher node, and the nodes in the communication group or in the stand-by group communicate with one another at regular time intervals to detect node trouble;
when a node detects that its one-level higher node has trouble, the node extracts one of its lower nodes and sends information about the extracted node to its two-level higher node as a candidate for a replacement for the node having trouble; and
the two-level higher node replaces the node having trouble with the extracted lower node.

4. An audio/video communication system according to claim 3, wherein when the two-level higher node receives two candidates for a replacement for the node having trouble from nodes connected to the node having trouble as lower nodes, the two-level higher node replaces the node having trouble with one of the candidates received earlier than the other.

5. An audio/video communication system according to claim 1, wherein
the system includes global network terminals; and
a proxy object of a local network terminal is stored in one of the global network terminals so that the global network terminal can relay the local network terminal to the communication system.

6. An audio/video communication system according to claim 5, wherein a proxy object of the local network terminal is arranged in a global network terminal in the stand-by group such that all global network terminals in the stand-by group will have a substantially same number of proxy objects when a local network terminal that is connected to a local network is to join in a stand-by group.

7. An audio/video communication system according to claim 5, wherein
all the nodes in a stand-by group communicate with one another at regular time intervals so that each of the nodes can obtain information about a number of proxy objects stored in its one-level lower node in the first side and a number of proxy objects stored in its one-level lower node in the second side; and
a node in the stand-by group sends a request for an addition of a proxy object of a new local network terminal to its one-level lower node in the first side or its one-level lower node in the second side that stores a smaller number of proxy objects, and when the node has no lower nodes, the node forms and stores a proxy object of the new local network terminal therein.

8. An audio/video communication system comprising a plurality of nodes that are connected into a balanced binary tree structure, wherein
each of the nodes includes at least a transmission control protocol connector connected to a higher node, a first lower node connector, a second lower node connector and a control program and is arranged to store first weight information about a weight of lower nodes in a first side diverging from the first lower node connector and second weight information about a weight of lower nodes diverging from the second lower node connector; and
a group arranged in a balanced binary tree structure such that:
if the first lower node connector of a root node is vacant, the root node connects a new node to the first lower node connector and increases the first weight information by 1;
if the first lower node connector of the root node is occupied and if the second lower node connector of the root node is vacant, the root node connects a new node to the second lower node connector and increases the second weight information by 1;
if both of the first lower node connector and the second lower node connector of the root node are occupied and if the first weight information of the root node is equal to or less than the second weight information of the root node, the root node sends a request for an addition of a new node to a first lower node that is directly connected to the first lower node connector and increases the first weight information by 1; and
if both of the first lower node connector and the second lower node connector of the root node are occupied and if the first weight information of the root node is greater than the second weight information of the root node, the root node sends a request for an addition of a new node to a second lower node that is directly connected to the second lower node connector and increases the second weight information by 1.

* * * * *